No. 752,328. PATENTED FEB. 16, 1904.
W. D. BROWN.
VEHICLE BRAKE.
APPLICATION FILED OCT. 7, 1903.
NO MODEL.
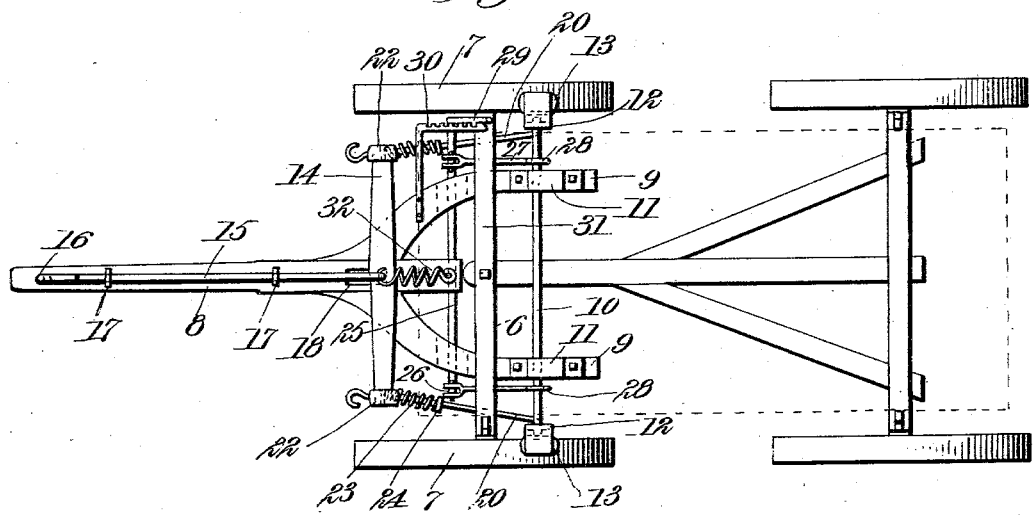
WITNESSES: C. H. Walker, Geo. E. Tew.
INVENTOR William D. Brown
BY Milo B. Stevens & Co.
Attorneys No. 752,328. Patented February 16, 1904.

UNITED STATES PATENT OFFICE.

WILLIAM D. BROWN, OF BLACKWATER, MISSISSIPPI.

VEHICLE-BRAKE.

SPECIFICATION forming part of Letters Patent No. 752,328, dated February 16, 1904.

Application filed October 7, 1903. Serial No. 176,033. (No model.)

*To all whom it may concern:*

Be it known that I, WILLIAM D. BROWN, a citizen of the United States, residing at Blackwater, in the county of Lafayette and State of Mississippi, have invented new and useful Improvements in Vehicle-Brakes, of which the following is a specification.

This invention relates particularly to brakes for carriages and wagons, and has for its object to provide an improved brake which will act upon the front wheels, the action being automatic with the pull or back of the horses, so that when the horses are pulling the brake will release, but when the horses are backing the brake will set. The means for the automatic application of the brake are also combined with and controlled by a hand mechanism for holding the brakes on or off, as desired.

In the accompanying drawings, Figure 1 is a plan view of the apparatus, and Fig. 2 is a side elevation thereof.

Referring specifically to the drawings, the front axle of a vehicle is indicated at 6 and the wheels 7 thereon. The tongue is indicated at 8, terminating in hounds 9, fastened across the axle. These parts are common and require no extensive description.

At 10 is indicated a bar loosely held under straps 11 upon the rear ends of the hounds behind the axle, and this bar is slidable laterally under the straps to vary the fulcrum-points of the levers 12, which carry the brake-shoes 13. Said levers are fixed to the respective ends of the bar and extend in a substantially vertical direction just inside each wheel, with the brake-shoes overhanging the top of the wheels. Vibration of the levers applies the brakes upon the top of the wheel.

In the automatic operation of the brakes the vibration of the levers carrying the brake-shoes is effected by connections acted upon by the neck-yoke and whiffletree of the team. The whiffletree is indicated at 14 and is slidably mounted upon the inner end of the tongue and held thereto by the downturned end of a rod 15, which extends thence lengthwise along upon the tongue to the front thereof, where it terminates in a shoulder 16, against which the neck-yoke rests when the team is hitched. The rod 15 is slidable lengthwise under guides 17 on the tongue, and the rear downturned end thereof, heretofore mentioned, extends through a hole at the middle of the whiffletree and thence through a slot 18, formed in the tongue under the whiffletree, and the terminal of said rod is threaded to receive a nut 19 under the tongue. Said downturned end thus forms the pivot-pin for the vibration of the whiffletree.

The ends of the whiffletree are connected by rods 20 to the lower ends of the brake-levers 12. These rods pass under the axle, and to produce a flexible or compressible construction they extend loosely through holes in flanges 21, projecting downwardly from ferrules or castings 22 upon the ends of the whiffletree. Springs 23 between the flanges and collars 24 on the rods yield to cushion the application of the brakes and avoid undesirable rigidity.

The hand apparatus for controlling the position of the pivot-bar 10 consists of a rock-shaft 25, supported in hangers on the under side of the hounds and has crank-arms 26 connected by rods 27 to the bar 10, said bar passing through eyes 28 at the ends of the rods. The rock-shaft 25 has at one end a hand-lever 29, which may be made of sufficient length to extend up beside the wagon box or seat, and this lever has spring engagement with a ratchet-segment 30, one end of which is fixed to the hounds and the other to the bolster 31.

As will be seen, the whiffletree 14 has forward-and-backward movement limited by the length of the slot 18, and it is normally retained in its rearward position by a spring 32.

In use normally the pull of the team on the whiffletree is communicated by the rods 20 to the levers 12, and by such pull the levers are so vibrated as to throw the brake-shoes out of contact with the wheel-tires. When the team is holding back, as in going downhill or slacking speed, the pressure of the neck-yoke against the shoulder 16 has the effect of forcing the rod 15 and whiffletree 14 rearwardly, which through the rods 20 throws the upper ends of the levers 12 forwardly and applies the brakes. This action is assisted by the spring 32, which, as said before, tends to draw the whiffletree rearwardly and is cushioned by the springs 23 to avoid wrecking of the parts liable to occur in case of sudden stop. By means of the hand-lever 29 and its connections with the rod 10 said rod may be moved forwardly or rearwardly to vary the location of the fulcrum of the levers 12, and consequently the location of the brake-shoes with respect to the tires. The brakes may be applied by hand in the same way. Thus if the hand-lever 29 be thrown forward it brings the brake-shoes nearer the wheels, and at or near the limit of its throw it sets the shoes on the wheels and by engagement with the ratchet 30 locks the same. This is useful when the team is standing. To allow the automatic or normal action, the hand-lever 29 is placed at about the middle of the segment, so that when the team is pulling the brakes will be lifted from the wheels, but as soon as the team begins to hold back the brakes are applied, and it is obvious that by variation in the position of the pivot-bar 10 by means of the hand-lever this action can be very nicely adjusted. Furthermore, to prevent the brakes acting at all, as when the vehicle is being backed, the lever 29 is thrown backward to the limit, which shoves the pivot-bar 10 so far back that the brake-shoes will not reach the wheels. It is obvious that the length of the slot 18 which limits the backward movement of the whiffletree and the length of the straps 11 which control the backward-and-forward movement of the pivot-rod 10 must be in proper proportion to allow the movements above described.

It will be seen that a construction is provided which is adjustable to permit and vary the automatic action in releasing and applying the brakes and in which the brakes are also capable of being applied by hand. The scope of the invention is not limited to the exact construction shown, but various modifications may be made without avoiding the following claims.

What I claim as new, and desire to secure by Letters Patent, is—

1. In a vehicle-brake, the combination with the front running-gear and the whiffletree slidable back and forth on the tongue, of the bar extending across the hounds, the upright brake-levers fulcrumed on the bar and having brake-shoes at their upper ends, and connections between the whiffletree and the lower ends of the levers.

2. In a vehicle-brake, the combination with the front running-gear and the whiffletree, of brake-levers connected to the whiffletree and actuated by pull or holdback thereon to release or set the brakes, and a hand-lever connected to the brake-levers to vary the location of the fulcrums thereof.

3. In a vehicle-brake, the combination with the front running-gear, of a pivot-bar slidable forwardly and backwardly on the hounds, brake-levers, having shoes on the end thereof, pivoted to said bar, a hand-lever connected to said bar, to slide the same, and draft devices connected to the levers and constructed to automatically release or set the brakes according to pull or holdback on said devices.

4. In a vehicle-brake, the combination with the front running-gear, of brake-levers, a bar slidably supported on the hounds, on which the levers are fulcrumed, a whiffletree having limited forward-and-backward movement on the tongue and a rigid connection to the neck-yoke, rods connecting the whiffletree and the brake-levers, and a hand-lever connected to said bar, to vary the location thereof.

In testimony whereof I have signed my name to this specification in the presence of two subscribing witnesses.

WM. D. BROWN.

Witnesses:
  A. H. GILBERT,
  W. R. MILLER.